July 19, 1966  J. G. WITHERS, JR  3,261,329
METHOD AND APPARATUS FOR HEATING WATER
IN TUBING WITHOUT SCALING
Filed Sept. 20, 1965
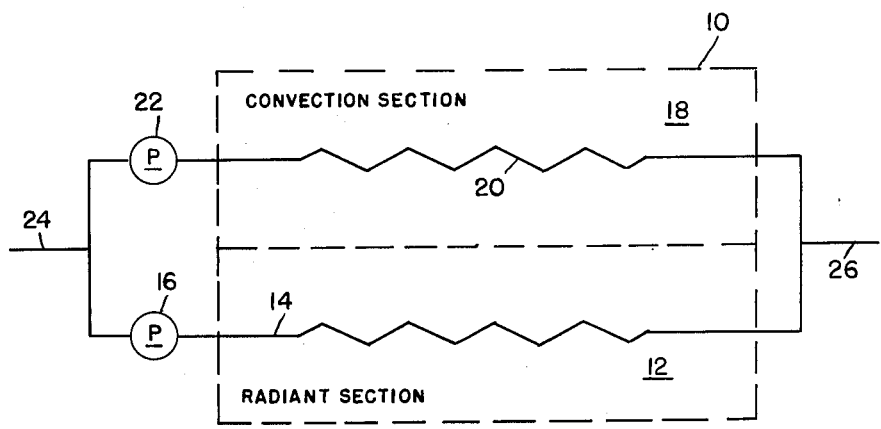
INVENTOR.
JAMES G. WITHERS JR.
BY Whittemore,
Hulbert & Belknap
ATTORNEYS 3,261,329
METHOD AND APPARATUS FOR HEATING WATER IN TUBING WITHOUT SCALING
James G. Withers, Jr., Dearborn, Mich., assignor to Calumet & Hecla, Inc., Allen Park, Mich., a corporation of Michigan
Filed Sept. 20, 1965, Ser. No. 493,607
6 Claims. (Cl. 122—379)

The present application is a continuation-in-part of my prior copending application Serial No. 321,746 filed November 6, 1963.

The present invention relates to method and apparatus for heating water in tubes without scaling.

It is an object of the present invention to provide a method and apparatus in which water is heated by a direct-fired process heater while passing through tubing in which the flow of water is divided between a first tubing normally susceptible to corrosion-erosion effects in which some of the water is caused to flow at relatively low velocity less than about 10 feet per second and in which the water is heated to a temperature sufficiently low to prevent substantial deposit of scale, and in which the rest of the water is caused to flow through a second tubing characterized by unusually high resistance to corrosion-erosion effects when subjected to the scouring action of high velocity water, in which the flow of water is at relatively high velocity, above about 15 feet per second and in which the water is heated to temperatures sufficient to cause substantial precipitation of salts, the deposit of the salts as scale being prevented by the high velocity flow of water, the flows of water through the two different tubings being thereafter combined to produce water at a temperature intermediate the discharge temperatures of the water from the first and second tubings.

It is a further object of the present invention to provide method and apparatus as described in the preceding paragraph in which the first tubing is of conventionally usel heat transfer material such as copper, cupronickel, or the like, and in which the second tubing is formed of titanium tubing.

Other objects and features of the invention will become apparent as the description proceeds, especially when taken in conjunction with the accompanying drawing, illustrating a preferred embodiment of the invention, wherein:

The figure is a diagrammatic view showing the direct-fired process heater.

Process heaters in which water is to be heated to temperatures above 140 degrees Fahrenheit are subject to the objection that if the water contains certain salts such as carbonates, these salts tend to precipitate when the temperature reaches or exceeds 140 degrees Fahrenheit and the precipitated salts deposit in the tubes, thus forming scale. This is particularly objectionable in heat transfer tubing of the type referred to since the scale leads to decreased heat transfer, higher tube wall temperatures, and in the case of a direct-fired heater may cause burn-out of the tubes.

A possible solution to the problem which would eliminate or materially reduce the deposit of scale in the tubing is to cause a relatively high velocity flow of water through the tubing. This, however, leads to further objectionable results in that the scouring action of high velocity water in tubing of materials normally employed in conventional water heaters causes corrosion-erosion effects, particularly at the higher temperatures, which shortens the life of the tubing and leads to early failure of the heater.

Tubing formed basically of titanium metal has been found to exhibit unusually high resistance to the corrosion-erosion effects when subjected to the scouring action of high velocity water. Even in sea water, titanium tubing withstands velocities of up to 40 feet per second for long periods of time. Recognizing this property of titanium metal tubing, it is possible to produce heaters in which this titanium tubing is used to heat a fraction of the water to a temperature higher than the final required temperature without serious scaling by causing the water to flow through the titanium tubing at velocities sufficiently high to prevent serious scale deposit. At the same time, another fraction of the water to be heated is passed through conventional tubing at velocities sufficiently low as to eliminate the corrosion-erosion effects attributable to high velocity flow and scale deposit is eliminated by limiting the temperature to which this fraction of the water is heated to temperatures sufficiently low to prevent substantial precipitation of salts.

Referring to the figure, a direct-fired furnace is diagrammatically indicated at 10 having a radiant section 12 in which water passing through heat transfer tubing indicated at 14 may be brought to relatively high temperatures; i.e., above 140 degrees Fahrenheit, such that solubility of dissolved salts is reduced to a point where the salts tend to precipitate and deposit as scale. In the tubing 14 however, the velocity of flow is maintained at a value sufficient to prevent substantial deposition of scale. The velocity of flow is above 10 feet per second and is preferably within the range of 10–40 feet per second.

The relatively high velocity of flow of water during heating through the tubing 14 could not be tolerated by conventional tubing such as copper, cupronickel, or ferrous material because of the corrosion-erosion effects of these metals when subjected to the scouring action of high velocity water, particularly at elevated temperatures. In accordance with the present invention the tubing 14 in the radiant section 12 is titanium tubing which has the property of unusually high resistance to the corrosion-erosion effects when subjected to the scouring action of hot, high velocity water.

Where reference is made herein to titanium tubing it is to be understood that this includes tubing formed of commercially pure titanium or titanium base alloys exhibiting the required resistance to the corrosion-erosion effects when subjected to the scouring action of hot, high velocity water. For this purpose titanium may be alloyed with one or more of the metals with which it is conventionally alloyed such for example as aluminum, vanadium, tin, etc.

The velocity of flow through the tubing 14 is maintained at the required value by suitable means such for example as a pump 16.

In the convection section 18 of the direct-fired furnace tubing 20 is provided which may be of conventional heat transfer metal such for example as copper, cupronickel, or ferrous metals or alloys, and water passing through this tubing is heated to a substantially lower temperature; i.e., below 140 degrees Fahrenheit, so as to avoid the decrease in solubility resulting at higher temperatures and thus to prevent substantial precipitation of salts and therefore deposition of scale. The velocity of flow through the tubing 20 is controlled by suitable means herein diagrammatically illustrated as the pump 22.

With the foregoing arrangement it will be observed that a flow of water in inlet conduit 24 is divided, a portion of this water flowing at relatively high velocity through the radian section of the furnace where it is heated to a temperature above the final desired temperature of the water in the outlet conduit 26. While the temperature of the water in this section of the heater is raised to a point where the reduction in solubility of the dissolved salts causes precipitation, the precipitation does not produce deposit of scale in the tubing 14 because of the high velocity. The high velocity which prevents the deposition of scale is possible only because of the exceptional resistance of titanium tubing to the scouring effects of high velocity water. The other fraction of the water which passes through the convection section 18 of the heater is heated to a much lower temperature such that the solubility of the dissolved salts is not reduced to a point where substantial scaling takes place. Thus, while the flow of water through the conventional tubing 20 is relatively slow and would allow scale deposit to take place, this is eliminated in this section of the heater by limiting the temperature to which the water is heated. The water passing through the two sections 12 and 18 is then re-combined in the outlet conduit 26 in which the temperature will of course be at a value intermediate the temperatures attained in the tubings 14 and 20.

An example of the foregoing employing a direct fired heater for processes where intube scaling may be a problem is given below:

Let it be desired to heat a quantity of water (W, lb./hr.), and having a heat capacity $c_p$=approximately 1.0 B.t.u./lb.-° F., from initial temperature $t_1$ to a final required temperature $t_2$. For illustration, assume $W$=1.0 pound per hour, $t_1$=60° Fahrenheit, $t_2$=160° Fahrenheit. At normal tube velocities (under 10 or 12 ft./sec.) the water is assumed to contain sufficient dissolved salts as to cause it to be a "bad scaler" at the 160 degrees Fahrenheit temperature level but not to scale substantially at the 120 degrees Fahrenheit level.

The required heat transfer Q is computed:

$Q = Wc_p(t_2-t_1)$
$Q = (1 \text{ lb./hr.})(1.0 \text{ B.t.u./lb.-° F.})$
$(160-60) = 100 \text{ B.t.u./hr.}$ For an illustrative design, the procedure is as follows:

(1) Divide the flow into two parallel streams as illustrated in the figure.

(2) Send one fraction (as for example 0.5) at high velocity (15–40 ft./sec.) through the titanium tube 14 located in the radian or high temperature section of the furnace. The heat duty $Q_{hv}$ required to heat this fraction of the water to a temperature of 200 degrees Fahrenheit is:

$Q_{hv} = (0.5)(1.0)(200-60) = 70 \text{ B.t.u./hr.}$ (3) Send the second fraction (0.5) at a relatively low velocity (below 10 ft./sec.) through conventional tubing such as copper tubes located in the low heat or convection section of the furnace. The heat duty $Q_{lv}$ required to heat this fraction of the water to a lower temperature of 120 degrees Fahrenheit is:

$Q_{lv} = (0.5)(1.0)(120-60) = 30 \text{ B.t.u./hr.}$ (4) Remix the two sub-streams of water in which the total heat absorbed in both is represented by $Q_t$, whence:

$Q_t = Q_{hv} + Q_{lv} = 70 + 30 = 100 \text{ B.t.u. hr.}$

Since the heat added to the two streams totals the amount of heat required to raise the temperature of the entire flow from 60 degrees Fahrenheit to 160 degrees Fahrenheit, the temperature of the water in the discharge conduit 26 will be at the required final temperature of 160 degrees Fahrenheit. However, scaling is eliminated in the conventional tubing section 20 since the water therein is heated to a temperature below that which would produce substantial scaling, while scaling is eliminated in the high velocity titanium tubing section because, while the temperature is raised to a value which precipitates substantial amounts of salt deposition in the form of scale is prevented due to the high velocity flow. As previously noted, this high velocity flow, even under the conditions stated, is permissible with titanium tubing as disclosed herein.

Fuel and tubing economy in the convection section is maximized by keeping the temperatures difference as high as possible between the flue gases and the water.

It will of course be apparent that the foregoing represents a simple example. In general, economy in the use of expensive titanium tubing is obtained by heating the water to the highest possible temperature in the radiant section and further, by maintaining the velocity of flow in the titanium tubing as high as possible; thus delivering the maximum heat content in B.t.u.'s with a minimum of the titanium tubing.

In the foregoing the conventional and titanium tubing are merely diagrammatically represented, but it will of course be appreciated that any suitable type of tubing may be employed, either prime tubing, finned tubing, or tubing provided with plate type fins. The individual tubes of the tubing sections may be arranged in parallel between headers or in other conventional arrangements.

The drawing and the foregoing specification constitute a description of the improved method and apparatus for heating water in tubes without scaling in such full, clear, concise and exact terms as to enable any person skilled in the art to practice the invention, the scope of which is indicated by the appended claims.

What I claim as my invention is:

1. Apparatus of the character described comprising a first heat exchange passage for scale forming liquid to be heated, said first passage being formed of a metal subject to severe corrosion-erosion effects at a flow velocity in excess of 10 feet per second, means for forcing a first flow of the liquid through said first passage at a velocity of less than 10 feet per second, means for heating the liquid in said first passage to a temperature less than sufficient to produce substantial deposit of scale at the stated flow velocity, a second heat exchange passage in parallel with said first passage and formed of a metal characterized by high resistance to the corrosion-erosion effects of high velocity liquid flow, means for forcing a second flow of the same liquid through said second passage at a velocity of more than 15 feet per second, means for heating the liquid in said second passage to a higher temperature sufficient to cause precipitation of scale-forming solids, and means for subsequently mixing the heated liquid from both passages to form a heated liquid whose temperature is intermediate that of the liquids attained in said passages.

2. Apparatus as defined in claim 1 in which said second passage comprises titanium tubing.

3. The method of heating water containing dissolved scale producing salts to a desired elevated temperature, which comprises passing a first flow of water through a first tubing susceptible to corrosion-erosion effects at high velocity flow at a velocity sufficiently low to prevent substantial corrosion-erosion effects and heating the water to a temperature sufficiently lower than the desired final temperature of the water to prevent substantial scale deposit, passing a second flow of water through titanium tubing, heating the water in the titanium tubing to a temperature higher than the desired final temperature, maintaining a flow velocity therein sufficiently higher than the flow velocity in the first tubing to prevent scale deposit, and mixing the heated water from both of said tubings.

4. The method of heating water containing dissolved scale producing salts to a desired elevated temperature, which comprises passing a first flow of the water through cuprous tubing at a velocity sufficiently low to prevent substantial corrosion-erosion effects and heating the water to a temperature sufficiently lower than the desired final temperature of the water to prevent substantial scale deposit, passing a second flow of the water through titanium tubing, heating the water in the titanium tubing to a temperature higher than the desired final temperature, maintaining a flow velocity therein sufficiently higher than the flow velocity in the cuprous tubing to prevent scale deposit, and mixing the heated water from both of said tubings.

5. The method of heating water containing dissolved scale producing salts to a desired elevated temperature, which comprises passing a first flow of the water through ferrous tubing at a velocity sufficiently low to prevent substantial corrosion-erosion effects and heating the water to a temperature sufficiently lower than the desired final temperature of the water to prevent substantial scale deposit, passing a second flow of the water through titanium tubing, heating the water in the titanium tubing to a temperature higher than the desired final temperature, maintaining a flow velocity therein sufficiently higher than the flow velocity in the ferrous tubing to prevent scale deposit, and mixing the heated water from both of said tubings.

6. A direct-fired water tube heater having a high temperature radiant heating section and a low temperature convection heating section, means for dividing a flow of water and causing a first part to flow through said radiant section and the remainder through said convection section, said means comprising first tubing within said radiant section capable of resisting the corrosion-erosion effects of water flow at velocities above 15 feet per second, means for maintaining the flow through said tubing at a velocity above 15 feet per second, said tubing being arranged in said radiant section to provide for heating the water therein to a temperature in excess of 140 degrees Fahrenheit, said means also comprising second tubing within said convection section and in parallel with said first tubing, said second tubing being formed of metals subject to severe corrosion-erosion effects at water flow at a velocity above 10 feet per second, means for maintaining the flow through said second tubing at a velocity less than 10 feet per second, said second tubing being arranged in said convection section to provide for heating the water therein to a temperature less than 140 degrees Fahrenheit, and means combining the flow of heated water from said first and second tubings to provide water heated to a temperature intermediate the temperature attained in said tubings.

References Cited by the Examiner

UNITED STATES PATENTS

| | | |
|---|---|---|
| 2,186,585 | 1/1940 | Hancock. |
| 2,644,820 | 7/1953 | Gresham _____ 23—252 |
| 2,856,074 | 10/1958 | Dubitzky. |
| 3,109,782 | 11/1963 | Nathan _____ 202—75 |
| 3,162,179 | 12/1964 | Strohmeyer _____ 122—448 X |

FOREIGN PATENTS 806,561   12/1958   Great Britain.

OTHER REFERENCES

Publication: "Research and Development on Scale Prevention in the United States," (Badger and Banchers); published in Proceedings of Symposium on Saline Water Conversion 1957, Office of Saline Water, U.S. Dept. of the Interior, in cooperation with the National Academy of Science-National Research Council, publication No. 568, pp. 49, 50, 78, and 79 relied on.

FREDERICK L. MATTESON, JR., *Primary Examiner.*

CHARLES J. MYHRE, *Assistant Examiner.*